United States Patent
Calcev et al.

(10) Patent No.: US 9,907,098 B2
(45) Date of Patent: Feb. 27, 2018

(54) SYSTEM AND METHOD FOR ASSOCIATION OF TRANSITORY WIFI USERS

(71) Applicant: FutureWei Technologies, Inc., Plano, TX (US)

(72) Inventors: George Calcev, Hoffman Estates, IL (US); Hanan Ahmed, Westland, MI (US); Bin Chen, Schaumburg, IL (US); Lin Cai, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 1003 days.

(21) Appl. No.: 14/046,772

(22) Filed: Oct. 4, 2013

(65) Prior Publication Data
US 2014/0098804 A1    Apr. 10, 2014

Related U.S. Application Data

(60) Provisional application No. 61/709,829, filed on Oct. 4, 2012.

(51) Int. Cl.
*H04W 76/02* (2009.01)
*H04W 76/04* (2009.01)

(52) U.S. Cl.
CPC .......... *H04W 76/02* (2013.01); *H04W 76/046* (2013.01)

(58) Field of Classification Search
CPC ............................ H04W 76/02; H04W 76/046
USPC ......................................................... 370/338
See application file for complete search history.

(56) References Cited

U.S. PATENT DOCUMENTS

| | | | |
|---|---|---|---|
| 2011/0116435 A1* | 5/2011 | Liu | H04L 1/1664 370/312 |
| 2011/0158216 A1 | 6/2011 | Zaks | |
| 2011/0199901 A1* | 8/2011 | Kavanaugh | H04W 48/06 370/230.1 |
| 2013/0028110 A1* | 1/2013 | Kogawa | H04W 74/0808 370/252 |

(Continued)

FOREIGN PATENT DOCUMENTS

| | | |
|---|---|---|
| CN | 102340880 A | 2/2012 |
| CN | 102695199 A | 9/2012 |

OTHER PUBLICATIONS

International Search Report Received in PCT/CN2013/087059, dated Feb. 27, 2014, 12 pages.

*Primary Examiner* — Andrew Chriss
*Assistant Examiner* — Ellen Kirillova
(74) *Attorney, Agent, or Firm* — Slater Matsil, LLP

(57) ABSTRACT

Embodiments are provided for identifying transitory WiFi users and providing a differential treatment of such users in terms of delaying associating steps between user stations (STAs) and an access point (AP). A transitory user refers to a user or user device that connects to a WiFi AP but does not run applications that require association or assigning IP addresses, such as short-term or temporary connected WiFi users that are on the move. In an embodiment, a STA connects to an AP. Upon the STA indicating its transitory behavior to the AP or the AP detecting criteria of transitory behavior of the STA, the STA obtains a delay time value from the AP. The STA then delays sending an association request to the AP, or alternatively, the AP delays handling the association request from the STA in accordance with the delay time value.

21 Claims, 2 Drawing Sheets

(56) References Cited

U.S. PATENT DOCUMENTS

2013/0044702 A1\* 2/2013 Jayaraman ............ H04W 48/06
370/329
2014/0064245 A1\* 3/2014 Abraham .............. H04W 72/10
370/331
2014/0101726 A1\* 4/2014 Gupta ................ H04N 21/2365
726/4

\* cited by examiner

SYSTEM AND METHOD FOR ASSOCIATION OF TRANSITORY WIFI USERS

This application claims the benefit of U.S. Provisional Application No. 61/709,829 filed on Oct. 4, 2012 by Bin Chen and entitled "System and Method for Association of Transitory WiFi Users," which is hereby incorporated herein by reference as if reproduced in its entirety.

TECHNICAL FIELD

The present invention relates to the field of wireless communications, and, in particular embodiments, to a system and method for association of transitory WiFi users.

BACKGROUND

In densely populated public areas, such as shopping malls, train stations, and airports, passing-by WiFi users may remain in the Access Point (AP) coverage for relatively short durations. A station (STA) refers to a wireless device that has an active WiFi interface. In many cases, the STAs of such shortly connected or "transitory" user have no data exchange running applications that would require WiFi association or resource consuming WiFi protocol exchanges with the AP. However, typically the STAs may still perform unnecessary network discovery, association, and Internet Protocol (IP) address allocation. This leads to increased WiFi signaling overhead, reduced air channel availability, overuse of network resources, and exhaustion of IP addresses. There is a need for mechanisms that resolve such issues and handle WiFi users that do not need to associate or perform unnecessary steps with the AP.

SUMMARY OF THE INVENTION

In accordance with an embodiment, a method implemented by a station (STA) for delayed association with an access point (AP) of a wireless network includes connecting to the AP, and obtaining a delay time value from the AP upon the STA indicating the transitory behavior to the AP or the AP detecting criteria of transitory behavior of the STA. The method further includes delaying sending an association request to the AP by a time period in accordance with the delay time value.

In accordance with another embodiment, a method implemented by an AP of a wireless network for delayed association with a STA includes connecting with the STA. Upon the AP detecting criteria of transitory behavior of the STA or the STA indicating the transitory behavior to the AP, the AP sends the STA a delay time value. The method further includes obtaining an association request from the STA after a delay in accordance with the delay time value.

In accordance with another embodiment, a user device configured for delayed association with a wireless network includes at least one processor and a non-transitory computer readable storage medium storing programming for execution by the at least one processor. The programming including instructions to connect to an AP of the wireless network, and obtain a delay time value from the AP upon the AP detecting criteria of transitory behavior of the user device or the user device indicating the transitory behavior to the AP. The programming includes further instructions to delay sending an association request to the AP by a time period in accordance with the delay time value.

In accordance with yet another embodiment, an AP of a wireless network configured for delayed association with a station (STA) includes at least one processor and a non-transitory computer readable storage medium storing programming for execution by the at least one processor. The programming including instructions to connect with the STA, and send the STA a delay time value upon the AP detecting criteria of transitory behavior of the STA or the STA indicating the transitory behavior to the AP. The programming further configures the AP to obtain an association request from the STA after a delay in accordance with the delay time value.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for handling association for transitory WiFi users and avoiding performing unnecessary association and other messaging steps between stations (STAs) and a WiFi access point (AP). The term transitory user (or transitory STA) is used herein to indicate users or user devices that connect to a WiFi AP but do not run applications that require association or assigning internet protocol (IP) addresses, such as short-term or temporary connected WiFi users that may be on the move. The embodiments include identifying transitory users and providing a differential treatment of such transitory users (in comparison to other WiFi users), which avoids unnecessary WiFi network association and IP address allocation. Such schemes improve air channel availability and reduce WiFi signaling overhead, depletion of IP addresses, and network resource (e.g., Authentication, Authorization, Accounting (AAA) server) overload.

The WiFi association procedure is delayed for transitory STAs by waiting for a timer expiration, or alternatively waiting for WiFi traffic from the STA, to trigger the association. The AP may delay the authentication or the association when the received authentication or association request message from a requesting STA shows that the requesting STA is a transitory STA. For example, the association request may include no traffic volume or an indicator showing that this STA is enabled as a transitory STA. The device may have a setting where this feature can be enabled, such as for the purpose of battery life saving. The term transitory is used herein to indicate a class or type of users or STAs that are assigned a differential association than other users or STAs. The differential association for transitory users is described in various embodiments below. For instance, the transitory users having the differential association are WiFi users that connect to an AP for relatively short time periods and/or have no data exchange running applications (e.g., remain idle) during a connection period, such as in the case of passing-by users in shopping malls, train stations, or airports.

Figure 1:
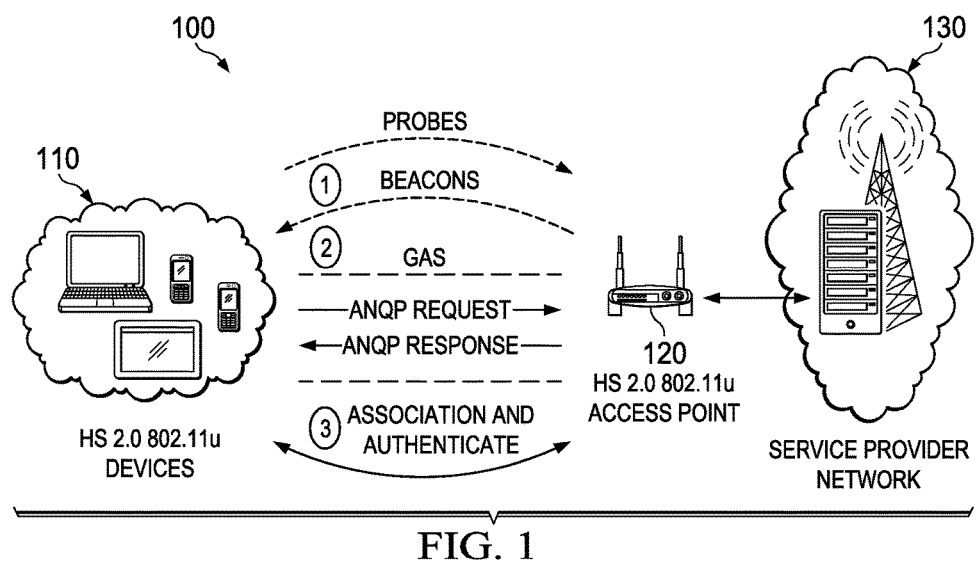
FIG. 1 illustrates a WiFi association scenario.

FIG. 1 illustrates a WiFi association scenario 100 implemented between STAs 110 and an AP 120. For example, the STAs 110 and AP 120 may have hotspot 2.0 (HS 2.0) Institute of Electrical and Electronics Engineers (IEEE) standard 802.11 capability. Examples of STAs 110 include smartphones, computer tablets, computer laptops, smart sensor devices, or any devices equipped with WiFi connection capability. The STAs 110 may also be able to interact with other types of communication networks, such as a cellular network. When a user chooses to connect to WiFi, the user's STA 110 scans for available hotspots within WiFi coverage range. The AP 120 and one or more STAs 110 can form a basic service set (BSS), which is the basic building block of an IEEE 802.11 wireless local area network (WLAN). The AP 120 may also communicate with an AP controller or an Access Network Query Protocol (ANQP) server, which can be collocated with the AP 120 or located elsewhere. To connect to the AP 120, a STA 110 may send a probe message or receive a beacon broadcasted from the AP 120. To establish a Generic Advertisement Service (GAS), the STA 110 sends an ANQP request to and receives an ANQP response from the AP 120. An IEEE 802.11u GAS operation can be used to provide for Layer 2 transport of an advertisement protocol's frames between a terminal and a server in the network prior to authentication. IEEE 802.11u ANQP is used to discover different features and available services of the network. The STA 110 can then associate and authenticate with the AP 120. Hence, the STA 10 begins IP address assignment and data communications, and the AP 120 provides the STA 110 with access to a service provider network 130.

As described above, the network resources may be overwhelmed when the number of STAs 110 attempting to connect and associate/authenticate with the AP 120 exceeds a threshold. To ovoid issues related to such scenarios, an STA 110 is assigned differential association treatment if the STA 110 is determined to be a transitory STA according to defined criteria. The differential authentication/association treatment includes delaying authentication/association and other messaging steps to establish WiFi communications between an STA and an AP, including at least one of the association, authentication, GAS, and ANQP operations above. The combination of association and messaging steps to establish and start WiFi communications (as in scenario 100) are also referred to herein as association steps. According to the defined criteria, the STA 110 is determined to be a transitory STA according to the traffic volume generated by the STA and the time spent in the AP coverage. For instance, if there is no traffic from the STA 110 and the STA 110 spends short time in the AP coverage, the STA is considered a transitory STA. According to other criteria, signaling status changes or associations of the STA 110 are continuously monitored (by STA or AP/network), e.g., during a time period, to determine a behavior of the STA. The amount of signaling status changes or associations over the monitored time period is used to determine if the STA is a transitory STA. For instance, if the amount of status changes or associations exceeds a threshold for a relatively short period of time, the STA is considered to be a transitory STA. The behavior of the STA may be continuously monitored, and may change over time (e.g., from transitory to non-transitory). In other criteria, the STA's movement is detected (e.g., using global positioning system (GPS) information from the STA 110) to determine or help in assessing the transitory state. According to other criteria, the STA 110 is checked for determining whether it is on and off a BSS coverage, e.g., within a relative short time. If the STA is detected to be on and off of BSS coverage for a relative short time, the STA is considered in a transitory state. The coverage time duration that is used to qualify a STA as transitory can be announced via a beacon broadcast from the AP 120 or configured in the STA 110 itself. For different embodiments, the different criteria above can be used individually or can be combined in any suitable combination to determine the transitory state of a STA 110. Further, in an embodiment, every STA 110 that has no active data traffic (e.g., in an idle state) is considered a transitory STA once the device enters the AP 120 coverage (e.g. before association.) A STA 110 may detect that it has entered in the AP 120 coverage by receiving a beacon, a probe response or by decoding other broadcast transmissions from that AP 120.

In the case of non-transitory STAs, typically once a STA detects that it has entered an AP coverage, the STA starts a network selection and AP association process, which may consists of one or more GAS requests to obtain ANQP attributes, authentication procedures, an association procedure, an IP address assignment, and data communications, such as described above. In an embodiment, to handle transitory STAs 110, the AP 120 is configured to broadcast, e.g., periodically, a time value or a set of time values that are used by the determined transitory STAs, for instance idle STAs according to one implementation, to postpone (delay) a relevant step of the connection process. In an example, a set of four time values may be broadcasted (labeled T1, T2, T3, and T4) or sent in the Probe Response message. A first time value, T1, is used by a transitory (e.g., idle STA) to delay the GAS request with respect to the instance when the STA detected that it has entered in the AP 120 coverage. As second time value, T2, is used by the transitory or idle STA to start the authentication process after the moment of entrance in the AP coverage. A third time value, T3, is used by this STA to start its association request process. A fourth time value, T4, is used by the STA to initiate the IP address request procedure with respect to the coverage entrance moment. Based on the steps taken by the transitory STA in the connection process, the time values satisfy the following inequality $T_4 \geq T_3 \geq T_2 \geq T_1 \geq 0$. The time values may be on the order of millisecond, hundreds of milliseconds, or any suitable time values, e.g., according to other system restrictions/requirements. In other implementations, any number of time values (less or greater than 4 values) may be used. An AP (or a network control entity) can allocate these time values as a function of the traffic load distribution for that AP or that of others in the vicinity, traffic type, and/or historic data regarding the transitory time of the users at that particular location. In another implementation, the set of time values is specified as system parameters pre-provisioned by the manufacturer or by the user via a configuration procedure. If a STA skips any of the above steps, for instance the GAS request, the STA can use the remaining time values as timer values for the other operations during the association process.

In an embodiment, the AP broadcasts multiple sets of time values where each set is dedicated to a different type of WiFi devices or different subscription class. For instance, smart phone devices use one set while some sensor type of devices use a different set of time values. The AP may periodically broadcast the type of devices and the set of time values used for association for each set.

In an embodiment, the mechanisms above are extended to handle the association behavior of transitory devices that have ongoing traffic (for instance during AP transition or re-selection). In this case, even the STAs that carry data traffic may be considered transitory. However, the transitory degree is determined by the amount and/or type of traffic handled by the device and the device type. For instance, according to WiFi standards, there are four categories of traffic (voice over IP (VoIP), video, best effort, and background) that can be used to differentiate the transitory degree of a device. Each of these types of traffic may require a minimum latency and throughput, which means that different delay times or set of delay times can be used for different traffic types (or different transitory degrees).

In an embodiment, the connection behavior is determined by the highest priority of the type of traffic that a STA carries. For instance, a STA that carries a VoIP or video is not considered a transitory STA, which may be equivalent to setting the time values where $T_4=T_3=T_2=T_1=0$. A STA that carries best effort traffic can use, for example, a set of time values where $T_4, T_3, T_2, T_1 \geq 0$ to define its behavior. A STA that carries only background traffic can use a set of time values where $T'_4, T'_3, T'_2, T'_1 \geq 0$ to determine when it starts the association steps. Another option is to only set one or more of the timers without restricting or specifying the others. The embodiments above can also be combined in any suitable manner to determine transitory STAs and implement accordingly a differential association treatment.

The proposed schemes above allow filtering of the transitory users depending on the time values, e.g., broadcasted by the AP. For instance, if a STA exits the AP coverage before the indicated time value T1, the STA does not start the GAS exchange protocol, which saves air time and transmission/battery power. The assessment of coverage can be based on missing a number of beacon transmissions from an AP, a GPS indication and a data base containing the coverage region, communications from an additional device (e.g., a near field communication device (NFC)), comparison of signal to noise ratio (SNR) to a threshold or other SNR values from other APs, other suitable means for indicating AP coverage, or combinations thereof. The other connection steps can be delayed similarly based on corresponding time values and detecting STA exit from AP coverage before the indicated time values.

As described above, the set of time values (e.g., $T_4, T_3, T_2, T_1 \geq 0$) may be broadcast by the AP periodically, or provided via the probe response. In another implementation, the time values are provided by the GAS ANQP parameter queries. In another implementation, the time values are provided to the user device via Management Objects (MOs), which are part of the subscription MO where policy may be provided by the operator for the network for selection purposes. Various implementations may be supported in the same system, and may be signaled by the AP or ANQP. The time values may also be used by the user device as a determining factor in network selection. For instance, a user device can select between two similar networks or hotspots the one which offers faster connectivity according to the hotspot's corresponding time values for delayed association steps.

In an embodiment, instead of having fixed time values, such as for $T_4, T_3, T_2, T_1 \geq 0$, each value for each association step (if assigned) is replaced by a range of values from which the STA can select randomly a delay time value while still maintaining the inequality $T_4 \geq T_3 \; T_2 \geq T_1 \geq 0$. This approach reduces the number of collisions for bursty access of relative large number of users.

In an embodiment, the transitory STA does not delay its association steps, and instead the AP adds a corresponding additional delay for each considered association step in order to filter out the transitory device's requests. In this case, the AP needs to make sure that the introduced delays are negotiated with the STA such that the STA refrains from retransmitting the GAS request, the authentication request, or other steps. This can be implemented via an immediate response from the AP which communicates to the STA the expected time for the response to the request. For instance, a transitory STA sends an authentication request. The AP responds immediately by communicating that the authentication response will be received after at least T2 time units. In this approach, as well in the previous embodiments, a STA can conserve power going to sleep until the authentication response is provided, or can move into a different channel to perform additional scanning Because this is an individualized approach, where each STA can have its own delays, the approach can be successfully used to handle bursty association requests from multiple STAs.

In the embodiments above, if at any point before the expiration of the timer the STA needs to transmit data, then the STA may switch to non-transitory state and start the delayed connection step. In a further embodiment, the AP may broadcast an indicator to reflect its support for the differential association feature for addressing transitory users. This indicator may be in a beacon, or probe response, or some other message. Alternatively, the AP may broadcast a positive indicator to indicate support for the feature or a negative indicator to indicate no support for the feature. Furthermore, the AP may be configured whether or not to broadcast such an indicator. For example, when an AP is deployed in an office or home area, there may be no benefit for using this feature and hence the feature is disabled in such scenarios. As such, the AP may not broadcast this indicator or may broadcast a negative indicator. On the other hand, if an AP is deployed in a railway station, airport, or some other public place, the AP may be configured to broadcast this indicator or a positive indicator so that the STAs can use the transitory feature.

In an embodiment, when a user triggers the STA to associate to an AP, the STA initiates the association immediately regardless whether it is in a transitory state. The STA may put an indicator to avoid delay to (or begin as soon as possible) the association request, authentication request, GAS request, or other steps. When the AP receives the request and detects such indicator, the AP responds to the request or accepts the association as soon as possible regardless.

Figure 2:
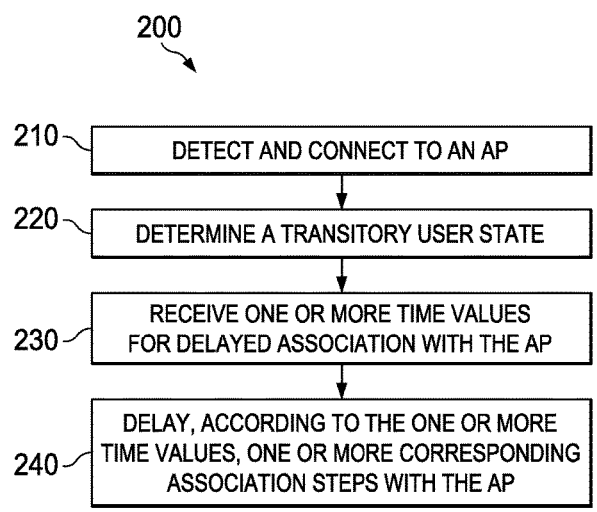
FIG. 2 illustrates an embodiment method for associating a transitory WiFi user with an AP.

FIG. 2 illustrates an embodiment method 200 by a transitory STA for associating with an AP. At step 210, the STA detects an AP, such as when the STA moves into the coverage of the AP. The STA may send a probe message to the AP and receive in return a response from the AP, or may detect a broadcasted beacon from the AP. The STA then starts a connection or link with the AP. At step 220, the method 200 determines the transitory behavior of the STA according to any of the criteria described above. This step can be performed at the STA or both the STA and AP by exchanging relevant parameters to the criteria. After the AP becomes aware of the STA transitory behavior, for example after being signaled by the STA about its transitory state, the AP indicates one or more time values for delayed association to the STA. The STA may send an indicator of its transitory state in an association request message to the AP. Alternatively, the STA may send an association request with no traffic to indicate its transitory state to the AP. At step 230, the STA receives one or more time values for delayed association with the AP. For example, the STA receives a set of four (or any other number) of time values for delaying corresponding association and messaging steps, as described in the embodiments above. The time values may be broadcast in the beacon (e.g., periodically), provided via the probe response, as part of the GAS ANQP parameters, in subscription MOs for determining network selection policy, or any other suitable exchange between the STA and the AP/network. At step 240, the STA delays one or more association steps according to the corresponding one or more indicated time values.

Figure 3:
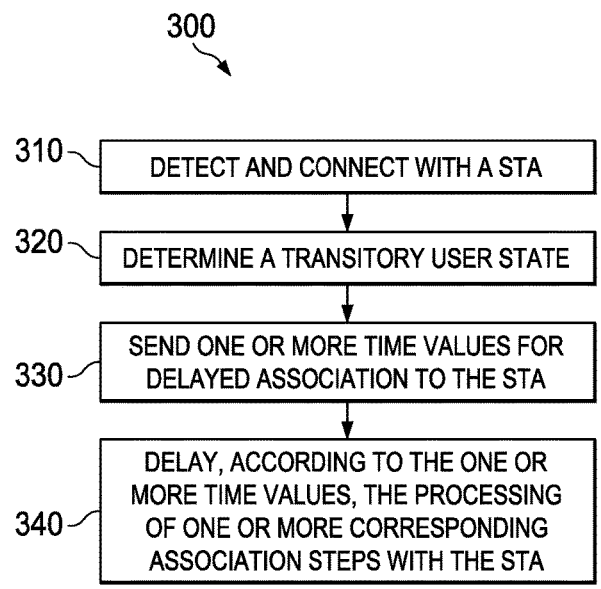
FIG. 3 illustrates another embodiment method for associating a transitory WiFi user with an AP.

FIG. 3 illustrates an embodiment method 300 by an AP for associating with a transitory STA. At step 310, the AP detects a STA, such as when the STA moves into the coverage of the AP. The AP may receive a probe message from the STA indicating the STA's presence, or receive a request to connect from the STA in response to a beacon from the AP. The AP then starts a connection or link with the STA. At step 320, the method 300 determines the transitory behavior of the STA according to any of the criteria described above. This step can be performed at the AP or both the AP and STA by exchanging relevant parameters to the criteria. After the AP becomes aware of the STA transitory behavior, the AP sends one or more time values for delayed association to the STA at step 330. The time values may be may be broadcast in the beacon (e.g., periodically), provided via the probe response, as part of the GAS ANQP parameters, in subscription MOs for determining network selection policy, or any other suitable exchange between the AP and STA. At step 340, the AP delays the processing of one or more association and messaging steps according to the corresponding one or more indicated time values.

Figure 4:
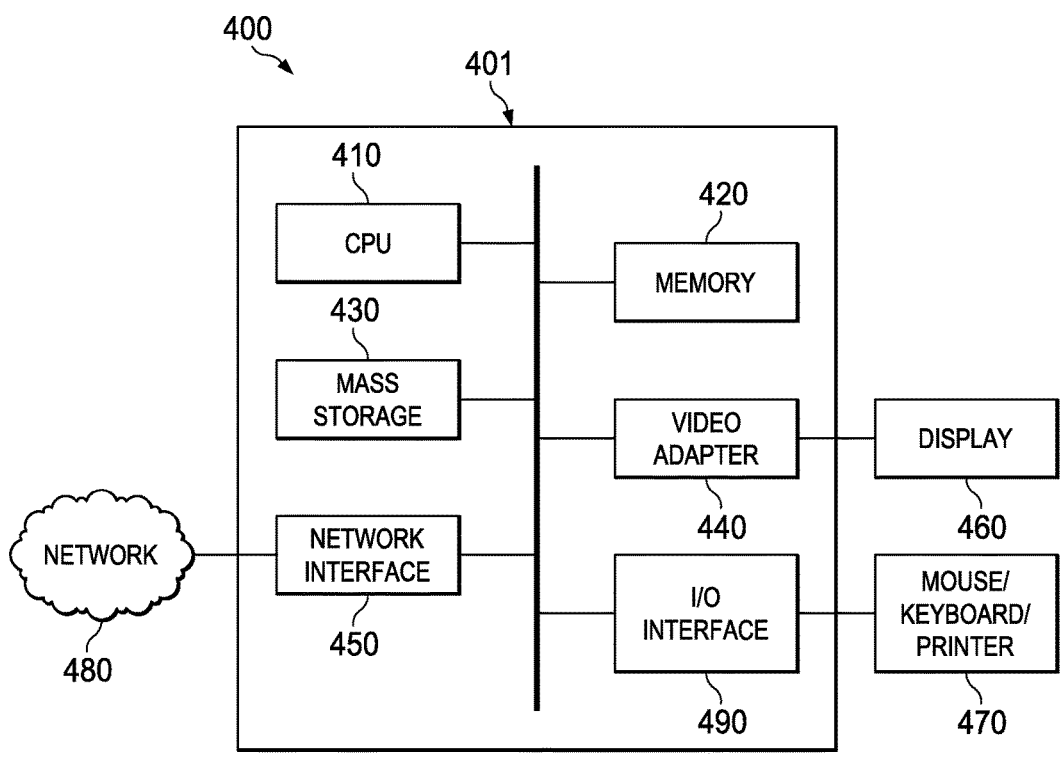
FIG. 4 is a diagram of an exemplary processing system that can be used to implement various embodiments.

FIG. 4 is a block diagram of an exemplary processing system 400 that can be used to implement various embodiments. The processing system is part of a UE, such as a smartphone, of a meeting scheduled attendee. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an Input/Output (I/O) interface 490 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 490 provide interfaces to couple external input and output devices to the processing unit. As illustrated, examples of input and output devices include a display 460 coupled to the video adapter 440 and any combination of mouse/keyboard/printer 470 coupled to the I/O interface 490. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a station (STA) for delayed association with an access point (AP) of a wireless network, the method comprising:
   connecting to the AP;
   determining that the STA is a transitory STA;
   obtaining a delay time value from the AP, after determining that the STA is a transitory STA;
   delaying sending an association request to the AP by a time period in accordance with the delay time value;
   connecting to a second AP;
   receiving, from the second AP, a second delay time value, after the second AP determines that the STA is a transitory STA; and
   associated with the AP or with the second AP after a delay, in accordance with a smaller one of the delay time value and the second delay time value.

2. The method of claim 1, further comprising:
   indicating, by the STA to the AP, that the STA is a transitory STA.

3. The method of claim 2, wherein determining whether the STA is a transitory STA includes detecting no traffic from the STA or an idle state of the STA upon connection.

4. The method of claim 2, wherein determining whether the STA is a transitory STA includes detecting a number of status changes or associations from the STA exceeding a defined threshold during a defined time period.

5. The method of claim 2, wherein determining whether the STA is a transitory STA includes detecting a movement behavior of the STA.

6. The method of claim 2, wherein determining whether the STA is a transitory STA includes detecting the STA exceeding a threshold number of on and off connections to a basic service set (BSS).

7. The method of claim 1, further comprising:
   further receiving, with the delay time value, a second delay time value from the AP; and
   delaying sending, to the AP, a Generic Advertisement Service (GAS) request, an Access Network Query Protocol (ANQP) request, an authentication request, or an Internet Protocol (IP) address request with the AP by a time period in accordance with the second delay time value.

8. The method of claim 1, wherein the delay time value is obtained from the AP in a broadcast beacon, a probe response, a Generic Advertisement Service (GAS) response, an Access Network Query Protocol (ANQP) response, or a Management Object (MO) for determining network selection policy.

9. The method of claim 1, wherein obtaining the delay time value from the AP includes:
   receiving a range of values from the AP; and
   randomly selecting the delay time value from the received range of values.

10. A method implemented by an access point (AP) of a wireless network for delayed association with a station (STA), the method comprising:
    connecting with the STA;
    determining that the STA is a transitory STA;
    sending the STA a delay time value in response to determining that the STA is a transitory STA;
    obtaining an association request from the STA after a delay in accordance with the delay time value;
    sending the STA a second delay time value for a Generic Advertisement Service (GAS) request, a third delay time value for an authentication request, and a fourth delay time value for an Internet Protocol (IP) address request;
    receiving the GAS request from the STA after a delay, in accordance with the second delay time value;
    receiving the authentication request from the STA after a delay, in accordance with the third delay time value; and
    receiving the IP address request from the STA after a delay, in accordance with the fourth delay time value, wherein the second delay time value is greater than the delay time value, the third delay time value is less than the delay time value and greater than the second delay time value, and the fourth delay time value is greater than the delay time value.

11. The method of claim 10, further comprising:
    receiving from the STA, an indication of transitory behavior of the STA;
    sending the STA the delay time value upon receiving the indication from the STA; and
    obtaining the association request from the STA after a delay, in accordance with the delay time value.

12. The method of claim 10, further comprising, in response to determining that the STA is a transitory STA, indicating support for delayed association to the STA.

13. The method of claim 10, wherein determining whether the STA is a transitory STA includes detecting no traffic from the STA or an idle state of the STA upon connection, a number of status changes or associations from the STA exceeding a defined threshold during a defined time period, a movement behavior of the STA indicating that the STA is a transitory STA, or the STA exceeding a threshold number of on and off connections to a basic service set (BSS).

14. The method of claim 10, wherein obtaining the association request from the STA after a delay in accordance with the delay time value includes:
    receiving the association request from the STA; and
    delaying at the AP the received association request for a time period equal to the delay time value.

15. The method of claim 10, further comprising:
    broadcasting different sets of delay time values, the different sets allocated for corresponding user devices having different types or subscription classes; and
    obtaining association requests from the corresponding user devices having different types or subscription classes after different delays, in accordance with the different sets of delay time values.

16. A user device configured for delayed association with a wireless network, the user device comprising:
    at least one processor; and
    a non-transitory computer readable storage medium storing programming for execution by the at least one processor, the programming including instructions to:
    connect to an access point (AP) of the wireless network;
    determine that the user device is a transitory STA;
    obtain a delay time value from the AP after determining that the user device is a transitory STA;
    delay sending an association request to the AP by a time period in accordance with the delay time value;
    connect to a second AP;
    receive, from the second AP, a second delay time value, after the second AP determines that the STA is a transitory STA; and
    associate with the AP or with the second AP after a delay, in accordance with a smaller one of the delay time value and the second delay time value.

17. The user device of claim 16, wherein the programming includes further instructions to:

indicate, to the AP, that the user device is a transitory STA.

18. The user device of claim 17, wherein the instructions to determine whether the user device is a transitory STA include instructions to detect no traffic from the user device or an idle state of the used device upon connection, a number of status changes or associations from the user device exceeding a defined threshold during a defined time period, a movement behavior of the user device indicating that the user device is a transitory STA, or the user device exceeding a threshold number of on and off connections to a basic service set (BSS).

19. An access point (AP) of a wireless network configured for delayed association with a station (STA), the AP comprising:

at least one processor; and a non-transitory computer readable storage medium storing programming for execution by the at least one processor, the programming including instructions to:

connect with the STA;

determine that the STA is a transitory STA, comprising determining that the STA is connected to the AP and that the STA does not require association with the AP;

send the STA a delay time value in response to determining that the STA is a transitory STA;

obtain an association request from the STA after a delay in accordance with the delay time value;

send the STA a second delay time value for a Generic Advertisement Service (GAS) request, a third delay time value for an authentication request, and a fourth delay time value for an Internet Protocol (IP) address request;

receive the GAS request from the STA after a delay, in accordance with the second delay time value;

receive the authentication request from the STA after a delay, in accordance with the third delay time value; and receive the IP address request from the STA after a delay, in accordance with the fourth delay time value, wherein the second delay time value is greater than the delay time value, the third delay time value is less than the delay time value and greater than the second delay time value, and the fourth delay time value is greater than the delay time value.

20. The AP of claim 19, wherein the programming includes further instructions to indicate support for delayed association to the STA.

21. The AP of claim 19, wherein the instructions to detect criteria of transitory behavior of the STA includes instructions to detect no traffic from the STA or an idle state of the STA upon connection, a number of status changes or associations from the STA exceeding a defined threshold during a defined time period, a movement behavior of the STA indicating that the STA is a transitory STA, or the STA exceeding a threshold number of on and off connections to a basic service set (BSS).

* * * * *